C. READ.
INSULATING COVERING FOR PIPES.
APPLICATION FILED OCT 7, 1920.
1,419,171.
Patented June 13, 1922.
2 SHEETS—SHEET 1.
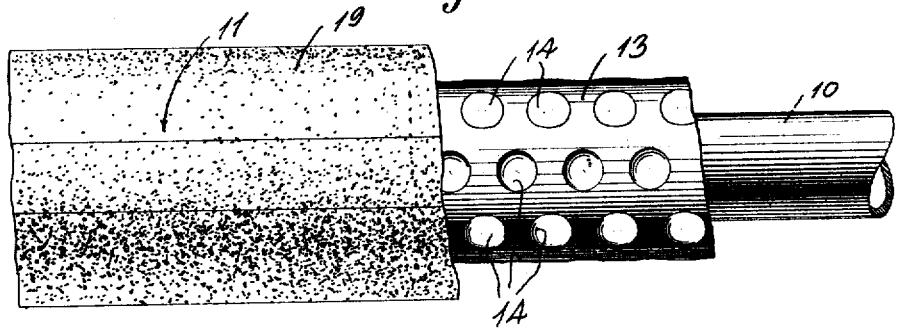
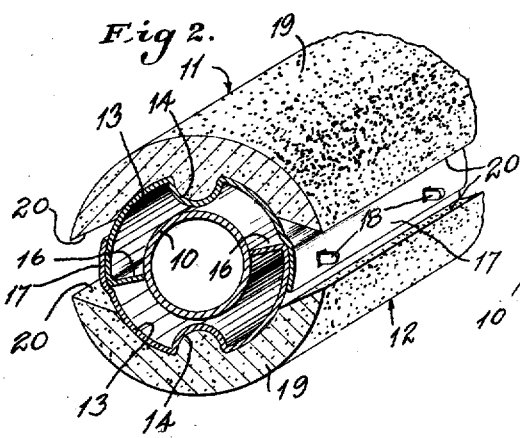
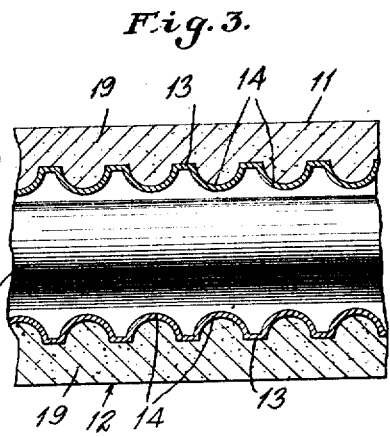
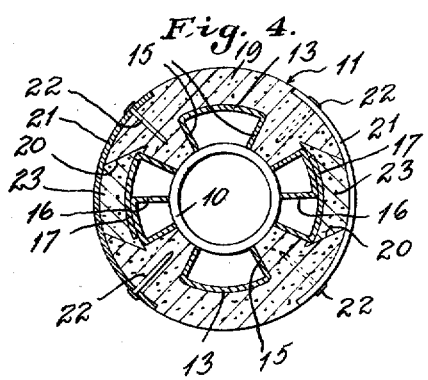
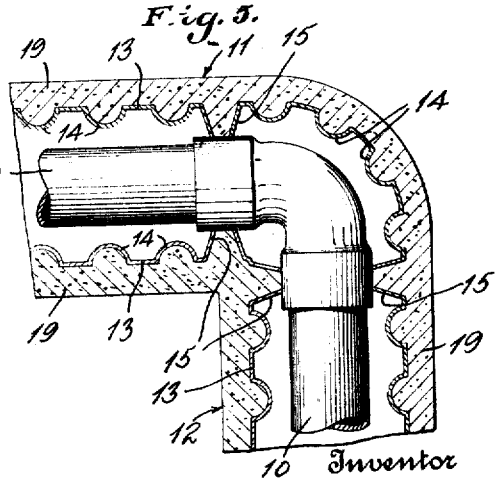
Inventor
Charles Read
By Attorney C. READ.
INSULATING COVERING FOR PIPES.
APPLICATION FILED OCT 7, 1920.
1,419,171.
Patented June 13, 1922.
2 SHEETS—SHEET 2.
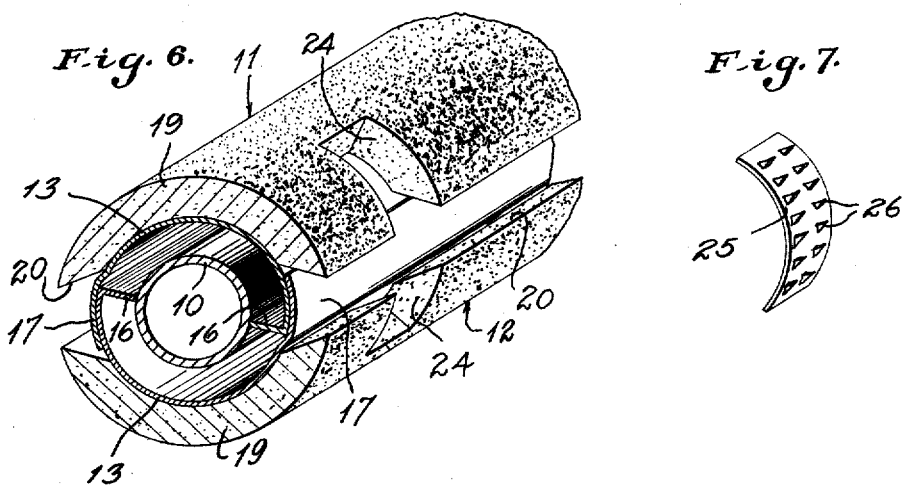
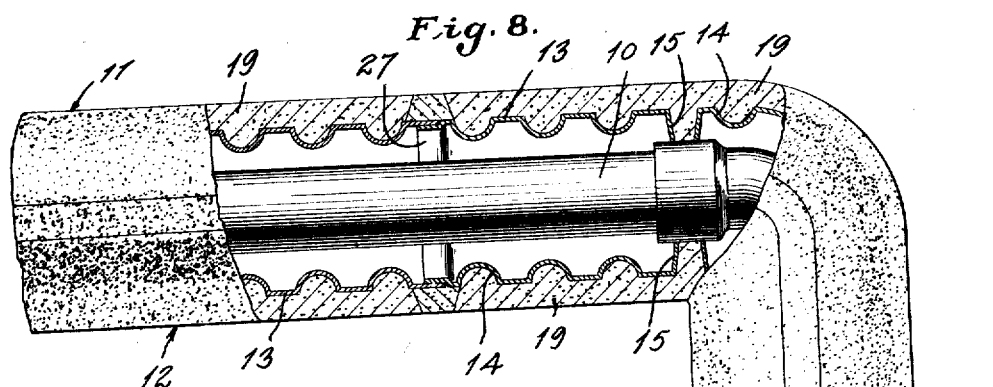
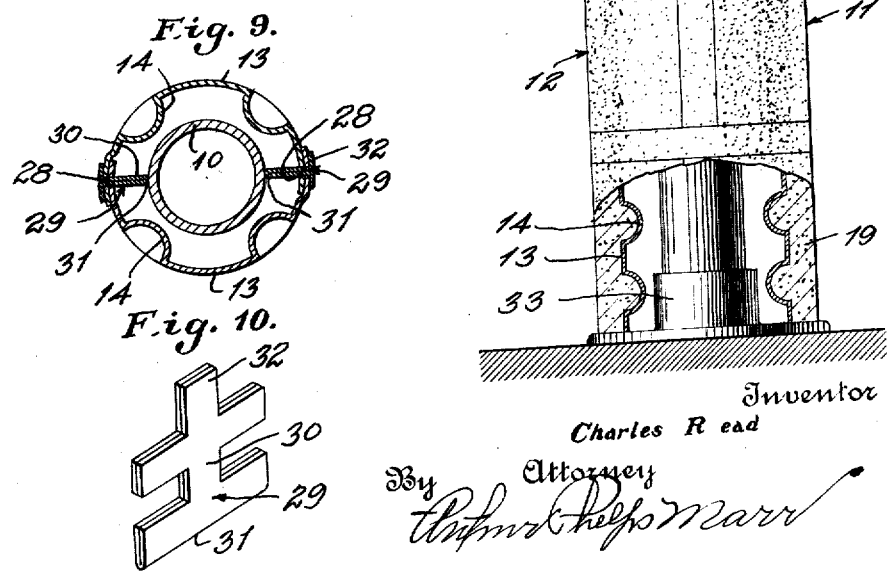
Inventor
Charles Read
By Attorney

UNITED STATES PATENT OFFICE.

CHARLES READ, OF BROOKLYN, NEW YORK.

INSULATING COVERING FOR PIPES.

1,419,171.  Specification of Letters Patent. Patented June 13, 1922.

Application filed October 7, 1920. Serial No. 415,229.

*To all whom it may concern:*

Be it known that I, CHARLES READ, a citizen of the United States, and resident of Morris Park, borough of Brooklyn, county of Kings, city and State of New York, have invented certain new and useful Improvements in Insulating Coverings for Pipes.

This invention relates to improvements in insulating coverings for pipes and is particularly adapted for use on steam or heat conveying pipes to prevent loss through radiation.

Another object of the invention is to provide a covering which is constructed to completely enclose the pipe in such a manner as to form a dead-air chamber there around which provides a particularly effective insulation which prevents radiation.

A further object of the invention is to provide an insulating covering which may be formed in sections and placed around the pipe, thus doing away with the necessity of building forms around the pipe and casting the insulation in place.

Still another object of the invention is to provide a novel means for connecting the insulation to the foundation and for securing the sections together.

With the above and other objects in view the invention consists of a novel construction, combination and arrangement of parts which will be fully set forth in the following specification, claimed and illustrated in the accompanying drawings, in which:—

Fig. 1, is a side view of a pipe and covering showing portions broken away to more clearly illustrate the details of construction.

Fig. 2, is a perspective view of Fig. 1.

Fig. 3, is a fragmentary sectional view through the device illustrated in Fig. 1.

Fig. 4, is a transverse sectional view illustrating the means for supporting the covering and Fig. 5, is a fragmentary longitudinal sectional view showing the formation of the covering around a pipe joint.

Fig. 6, is a perspective view of a modified form of cover section illustrating the recesses cast therein to receive the ties.

Fig. 7, is a perspective view of one of the ties used in connection with the structure shown in Fig. 6.

Fig. 8, is a side view of a pipe showing this covering applied thereto and illustrating in detail the method of connecting adjacent sections as well as the flanged floor plate used on vertical runs.

Fig. 9, is a sectional view through a fibrous foundation section, and

Fig. 10, is a perspective view showing the clip used for securing the fibrous sections together and supporting the same in spaced relation to the pipe.

Referring to the drawings in detail, the numeral 10 designates a pipe on which the pipe covering is supported. The covering above referred to consists of a pair of covering sections 11 and 12 respectively, each of which comprises mating foundation sections 13 which are stamped from a sheet of metal and provided at spaced intervals and in staggered relation with a plurality of indentations 14. At spaced intervals throughout the length of the device, certain of the indentations which are designated by the numeral 15 are punched through, so that their inner edges engage the periphery of the pipe to form supports therefor. One longitudinal edge of each section is provided with an inturned flange 16 and the opposite longitudinal edge is provided with an overlapping member 17, so that when the device is assembled, the overlapping portion 17 lies over the edge of the adjacent section carrying the flange 16.

Formed on each foundation section 13 adjacent the flange 16 is a plurality of spaced tongues 18 which are struck therefrom and bent outwardly as illustrated in Fig. 2. These tongues are adapted to project through slots formed in the overlapping portions 17 and it will thus be seen that the device may be readily secured in assembled position by extending said tongues through the slots and bending the same downwardly. The foundation members above described are placed in forms and covered with a plastic coating 19 which preferably consists of a mixture of magnesia asbestos compound. Obviously the coating will enter the recesses 14 and 15 so as to firmly bind the foundation and prevent the possibility of the coating from separating therefrom. As illustrated in Figs. 2 and 4, the longitudinal edges of the plastic coating are spaced from the edges of the foundation sections and are inclined as at 20 in such a manner that when the device is assembled around the pipe a pair of diametrically opposed dove-tailed grooves are formed so as to permit freedom of access to the securing tongues 18.

After the device has been assembled in the manner shown, suitable retaining straps 21 are attached by suitable fastening means such as nails 22 to the opposite sections and in this manner two separate sections of the coating 19 are securely bound together. A suitable plastic filling 23 is then filled in the dove-tailed grooves formed by the inclined walls and the entire covering is then complete. Obviously the plastic coating 23 needs but little to retain it in place and therefore the necessity of building a form around the pipe is eliminated. The same general process is followed in enclosing a bend or joint in a pipe except that care must be exercised in the proper position of the recess 15 over the pipe joint as shown in Fig. 5.

In the modified form of the invention shown in Fig. 6 the insulating material 19 is formed with spaced recesses 24 to receive the arcuate clips 25 which are of a size to fit in the recesses and are provided with points or spurs 26 which are struck therefrom and bent outwardly at right angles to provide anchoring means for the plastic filling which is subsequently applied to fill the recesses.

The foundation sections are joined at their abutting ends as shown in Fig. 8 by spinning down to a reduced diameter one end of each section so as to form a reduced flange 27 which fits into the end of the abutting or next adjacent section as shown. Obviously the coating of insulating material terminates short of the ends of the foundation sections and the ends of said coating are inclined as shown to form an annular dove-tail groove which is filled after assembly with a plastic material such as is used to fill the longitudinal grooves.

Obviously the foundation sections may be formed of fibrous material and in this construction which is best illustrated in Fig. 9, the edges overlap as shown and are provided with mating slots 28 for the reception of the securing and spacing members 29. The securing and spacing members comprise a sheet of metal 30 folded centrally as at 31 and provided with reduced ears 32 which are received in the openings 28 and bent outwardly as shown in Fig. 9.

When the device is used on a vertical run of pipe, commonly known as a riser, a floor plate such as that illustrated at 33 in Fig. 8 is used to prevent the plastic filler used in the longitudinal dove-tail grooves as the sealing material, from running out at the lower end of the grooves.

While in the foregoing there has been shown and described a preferred embodiment of this invention, it is to be understood that certain minor changes in the details of construction, combination and arrangement of parts may be resorted to without departing from the spirit and scope of the invention as claimed.

What is claimed is:—

1. An insulating covering for pipes comprising a plurality of mating foundation sections, each having a plurality of spaced staggered recesses therein; a covering of insulating material secured to the outer side of each covering; locking means for securing the foundation sections together and means for spacing the covering away from a pipe to provide a dead air chamber therearound.

2. An insulating covering for pipes comprising a plurality of transversely arcuate foundation sections, an inturned spacing flange formed along one longitudinal edge of each section; an overlapping portion formed along the opposite edge of each section and overlying a portion of the opposite section adjacent the spacing flange, locking means for holding the sections in assembled position and a covering of insulating material carried by each section.

Signed at the city of New York, in the county and State of New York, this 14th day of June, 1920.

CHARLES READ.